(12) United States Patent
Binder

(10) Patent No.: US 6,208,115 B1
(45) Date of Patent: Mar. 27, 2001

(54) BATTERY SUBSTITUTE PACK

(76) Inventor: Yehuda Binder, Yeshurum Street 30, 45200 Hod Hasharon (IL)

( * ) Notice: Subject to any disclaimer, the term of this patent is extended or adjusted under 35 U.S.C. 154(b) by 0 days.

(21) Appl. No.: 09/446,006

(22) PCT Filed: Jun. 16, 1997

(86) PCT No.: PCT/IL98/00194

§ 371 Date: Dec. 16, 1999

§ 102(e) Date: Dec. 16, 1999

(87) PCT Pub. No.: WO98/48539

PCT Pub. Date: Oct. 29, 1998

(51) Int. Cl.[7] .............................. H02J 7/00; H02M 2/00; H02M 2/10
(52) U.S. Cl. ........................ 320/108; 429/10; 429/100; 307/66
(58) Field of Search .................................. 320/108, 107; 429/10, 96, 100, 121; 307/66

(56) References Cited

U.S. PATENT DOCUMENTS

| | | | |
|---|---|---|---|
| Re. 31,458 | * | 12/1983 | Trattner ................................ 429/100 |
| 3,586,870 | * | 6/1971 | Cwiak ..................................... 307/66 |
| 3,938,018 | | 2/1976 | Dahl . |
| 4,031,449 | | 6/1977 | Trombly . |
| 4,374,354 | | 2/1983 | Petrovic et al. . |
| 4,408,151 | | 10/1983 | Justice . |
| 4,806,440 | * | 2/1989 | Hahs, Jr. et al. .................... 429/100 |
| 4,873,677 | | 10/1989 | Sakamoto et al. . |
| 4,942,352 | | 7/1990 | Sano . |
| 5,159,256 | | 10/1992 | Mattinger et al. . |
| 5,277,993 | * | 1/1994 | Landers ................................. 429/10 |
| 5,329,274 | | 7/1994 | Donig et al. . |
| 5,367,242 | | 11/1994 | Hulman . |
| 5,389,009 | * | 2/1995 | Van Sckenck, III ................ 439/500 |
| 5,396,538 | | 3/1995 | Hong . |
| 5,536,979 | | 7/1996 | McEachern et al. . |
| 5,550,452 | | 8/1996 | Shiral et al. . |
| 5,568,036 | | 10/1996 | Hulsey et al. . |
| 5,600,225 | | 2/1997 | Goto . |
| 5,618,023 | | 4/1997 | Eichholz et al. . |

FOREIGN PATENT DOCUMENTS

| | | |
|---|---|---|
| 0642203 | 3/1995 | (EP) . |
| 2623345 | * 11/1987 | (FR) . |

OTHER PUBLICATIONS

Patent Abstracts of Japan, Pub. No. 07326390, Pub. Date Dec. 12, 1995.

* cited by examiner

Primary Examiner—Peter S. Wong
Assistant Examiner—Gregory J Toatley, Jr.
(74) Attorney, Agent, or Firm—Browdy and Neimark

(57) ABSTRACT

A battery substitute pack (10), comprising a casing (15) dimensioned for accommodation in a battery compartment of predetermined size and housing therein an energy transfer circuit (14, 30) for receiving electrical energy remotely via a contactless charging unit (20-), and a positive supply terminal (16) and a negative supply terminal (17) coupled to the energy transfer circuit (14, 30) for connecting to corresponding positive and negative contacts of the battery compartment. Preferably, the battery substitute pack (10) contains at least one rechargeable cell (11) which may be recharged via induction by means of a contactless charging unit (20).

14 Claims, 4 Drawing Sheets

BATTERY SUBSTITUTE PACK

CROSS REFERENCE TO RELATED APPLICATION

The present application is the national stage under 35 U.S.C. 371 of PCT/IL97/00194, filed Jun. 16, 1997.

FIELD OF THE INVENTION

The present invention relates to a contactless charging unit for a portable device, and particularly to a charging device for contactlessly charging rechargeable batteries.

BACKGROUND OF THE INVENTION

There has become an increasing trend during the past two decades or so to render devices free of electrical supply feeders. To this end, hand-held portable appliances powered by internal batteries have become increasingly popular and this trend has become more manifest as the technology of rechargeable cells has improved. In order to ensure compatibility between the batteries and appliances manufacturers, standardization is widely effective in the batteries arena. As such, the batteries are manufactured in defined output voltages (1.5, 4.5, 9 Volts, for example), as well as defined "standard" mechanical enclosures (usually defined by letters "A", "AA", "B" sizes etc.). Likewise, corresponding battery compartments are provided in electronic appliances for accommodating batteries of specific size Essentially, there exist two types of batteries: disposable or primary batteries intended for one-time use; and rechargeable or secondary batteries which can be recharged many time by connecting to an appropriate charger. Rechargeable batteries, although initially more expensive than their primary counterparts, quickly pay for themselves owing to their multiple use and are more environmentally "friendly" because they are disposed of much less frequently. In many cases they may even be safer for the end user.

As against these benefits, rechargeable batteries are often less convenient than disposable cells which are always on tap, fully charged and ready for use. In contrast to this, rechargeable cells must be regularly recharged, requiring opening of the appliance or its battery compartment, removal of the battery and its connection to the charger. Such a process is frequently cumbersome and time-consuming. Furthermore, in order to keep the appliance continuously ready-for-use, at least one standby battery must be maintained fully charged: thus increasing the running cost as well as adding to the inconvenience.

The drawback associated with removal of the battery from the appliance has been addressed in the prior art: principally by means of the provision of non-contact battery chargers allowing the battery to be recharged in situ by electromagnetic induction. Thus, U.S. Pat. No. 5,600,225 to Goto concerns the charging of rechargeable batteries installed in radio communication devices such as radiotelephones by means of devices which do not require connection to the radiotelephone. The particular aspect to which Goto relates to improving the charging efficiency whilst also allowing easy removal of the radio communication device from the charger, should it be necessary to make or receive a call during charging.

U.S. Pat. No. 4,873,677 to Sakamoto et al. discloses an apparatus for charging a rechargeable battery within an electronic device, particularly a wrist watch. A power source provides direct current which is alternated in direction through a pair of primary coils for inducing alternating current in a secondary coil of the electronic device. A battery within the electronic device is trickle charged via a half wave rectifier connected to the secondary coil.

Other examples of prior art references to non-contact battery chargers include U.S. Pat. No. 4,031,449 to Trombly which discloses a solid state electronic battery charger which is electromagnetically coupled to one or more batteries. U.S. Pat. No. 3,938,018 to Dahl and U.S. Pat. No. 5,550,452 to Shirai et al. both disclose induction charging systems, and U.S. Pat. No. 5,396,538 to Hong discloses a contactless charging system of a radio telephone comprising a portable device and a base unit, for charging a battery of the portable device by induction voltage of an electromagnetic field formed by inductive coupling. There are many other prior art references relating to the contactless recharging of electrical vehicle batteries.

It is thus apparent that the drawback relating to the need for a rechargeable battery which may be recharged within an appliance is addressed in the prior art. However, all of the systems described in the prior art employ additional circuitry which, in minimum form, includes a coil for inductive coupling with an external source and suitable rectification for allowing trickle charging of the battery. This, in turn, requires that the appliances for use with such systems must themselves be custom designed in order to accommodate the additional circuitry: thus adding to the cost thereof.

Furthermore, the charger must be mechanically designed in tandem with the appliance in order to increase the mutual induction coefficient between the coils in the charger and in the appliance. The specific mechanical structure which thus results prohibits the use of the charger or the appliance for applications other than those designed for.

The additional circuitry inside the appliance is "built-in" and cannot be removed, thus precluding the usage of standard (non-rechargeable) batteries. Such modification to the appliances may be acceptable when use of the enclosed rechargeable battery is obligatory; such as when access to the battery compartment is so bothersome that the replacement of primary, non-rechargeable, batteries is hardly viable.

In fact, there exist many occasions when access to the battery compartment allowing replacement of the battery is feasible and only mildly inconvenient, even though the use of rechargeable batteries is desirable if only because of their economic advantages. If, in these circumstances, it is decided to employ rechargeable batteries, then it is clearly frustrating to be compelled to removed the battery for charging with the attendant inconvenience that this implies.

Moreover, portable electronic appliances lose their portability once they are constrained to be used with rechargeable batteries. Often, such appliances are used remote from any source of electricity supply: such as when travelling, camping out, and the like. As noted above, this requires the provision of at least one fully charged standby battery which can be substituted for an expired battery. However, there is a limit to how many standby rechargeable batteries can conveniently be maintained available and therefore portable appliances must remain capable of being powered by readily available, relatively inexpensive, secondary batteries.

Yet a further consideration relating to portable appliances apart from the inconvenience of constant battery replacement is the cost of new batteries. Portable appliances are often used in an area having easy access to a main electricity supply socket and it is therefore known to allow such appliances to be powered by the main electricity supply usually via an adapter. However, this approach suffers from the drawback that the appliance becomes tied to the electricity supply socket and thereby loses some of its portability. Furthermore, in order to provide the option to save battery power even when the appliance is transported, the adapter must also be transported or a spare must be maintained at each principal location where use of the appliance is intended. This is inconvenient or costly.

SUMMARY OF THE INVENTION

It is an object of the invention to provide a battery substitute pack which can be accommodated in a standard battery compartment but which is nevertheless amenable to contactless energy capture without requiring any modification to the appliance.

To this end, there is provided in accordance with a broad aspect of the invention a battery substitute pack capable of being mounted in a battery compartment of an electrical appliance for providing energy thereto, said battery compartment having fixed thereto a positive contact and a negative contact for engaging corresponding positive and negative terminals of the battery substitute pack disposed in a casing thereof.
characterised by:
  an energy transfer circuit within the casing being connected to said positive and negative terminals and capable of receiving electrical energy remotely via a contactless charging unit and at least partially energizing the electrical appliance.

Preferably, there is provided at least one rechargeable cell within the casing coupled to the energy transfer circuit for allowing the at least one rechargeable cell to be charged remotely via the contactless charging unit.

Preferably, the size of the battery casing conforms to industry standard, the battery substitute pack thus offering complete flexibility since a regular, non-rechargeable or rechargeable battery could be substituted therfor when required.

Preferably, the contactless charging unit operates by inductive coupling with the battery substitute pack enabling contact less charging of the cell while housed in an appliance, within proximity of the charging unit. Alternatively, the battery substitute pack can be used as a standalone unit so as to allow the rechargeable cell to be recharged regardless of whether or not the battery substitute pack is mounted within an appliance.

The battery pack according to the invention requires no change to the appliance which may continue to be used with standard rechargeable and non-rechargeable batteries. However, the charging efficiency, and thus the time required for full charging, is dependent on the power of the charging unit, as well as the attenuation of the electromagnetic field received induced in the secondary coil. A metal casing, for example, is liable to shield and attenuate the field, thereby causing low charging efficiency.

The invention is particularly useful for appliances in which the operational profile is of long idle storage, and periodic short usage and also where safety considerations preclude the use of mains power or connectors, such as TV remote controls, electrical toothbrushes, shavers, emergency lighting units and so on. Likewise, the invention finds application in hazardous areas, such as coal mines and the like, where batteries are required to be the only electrical energy source.

If desired, the rechargeable cell can be dispensed with in those cases where a main electricity supply is constantly available allowing contactless energy transfer by induction from the electricity supply to an appliance containing the battery substitute pack. This avoids the need for connecting to the appliance cables as well as main transformers and adapters, thus rendering the appliance more portable and convenient. If, nevertheless, the appliance must be transported and used in transit, then the battery substitute pack can itself be replaced with a regular battery. Alternatively, a rechargeable cell may be inserted therein so as to allow fully portable use as well contactless recharging of the rechargeable cell when the appliance is brought into proximity with a remote charging unit.

An additional advantage of mounting the charging circuit integral with the battery substitute pack is that the charging circuit can be customized for the specific battery, thus resulting in high charging efficiency and long battery life including a large number of charging cycles.

BRIEF DESCRIPTION OF THE DRAWINGS

In order to understand the invention and see how the same may be carried out in practice, some preferred embodiments will now be described, by way of non-limiting example only, with reference to the accompanying drawings, in which.

DETAILED DESCRIPTION OF PREFERRED EMBODIMENTS

Figure 1:
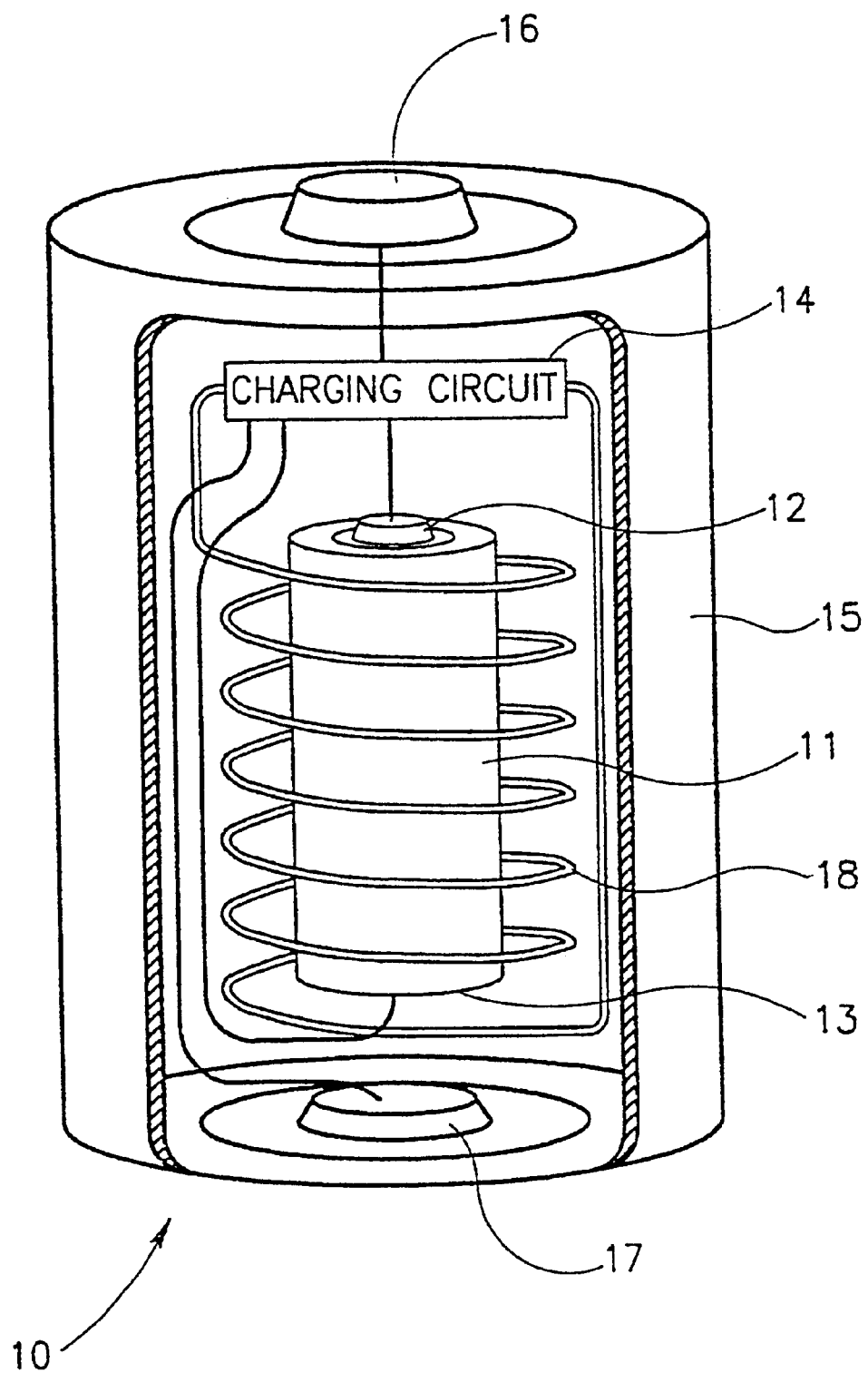
FIG. 1 is a partially sectioned pictorial representation of a battery substitute pack including a rechargeable cell and an integral charging circuit according to a first embodiment of the invention.
Figure 3:
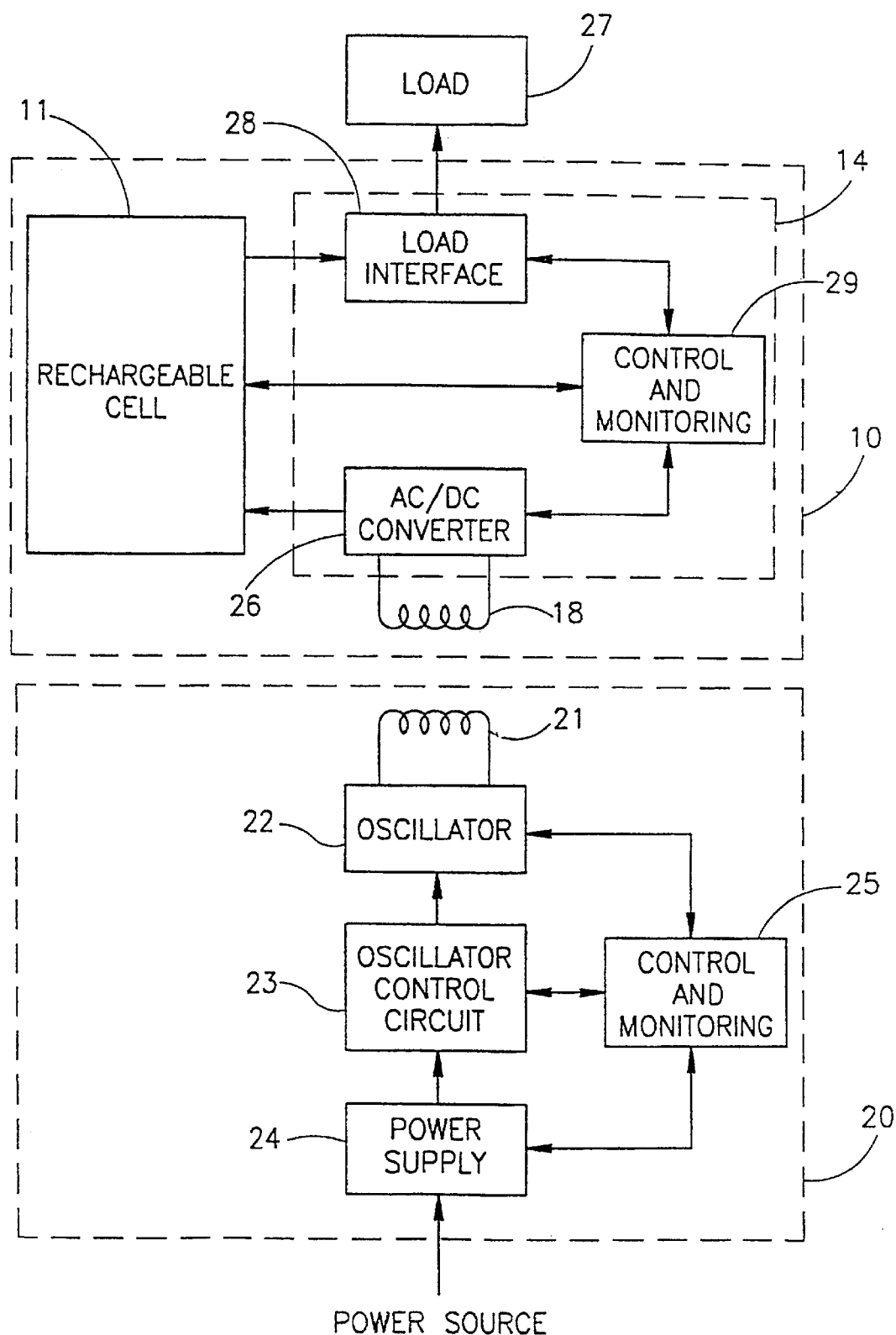
FIG. 3 is a block diagram illustrating functionally the charging circuit shown functionally in FIG. 1 in conjunction with a contactless charging unit for charging the rechargeable cell by inductive coupling.

FIG. 1 show pictorially a battery substitute pack 10 according to a first embodiment including a rechargeable cell 11 having positive and negative terminals 12 and 13 respectively coupled to an integral charging circuit 14 for allowing the rechargeable cell 11 to be charged remotely via a contactless charging unit (shown in FIG. 3). The rechargeable cell 11 together with the charging circuit 14 are housed in a casing 15 which is provided with positive and negative end terminals 16 and 17, respectively. Also provided is a coil 18 (constituting a secondary coil) for inductive coupling with a primary coil in the charging unit, whereby current may be induced remotely in the coil 18 thereby energizing the charging circuit 14. The casing 15 is dimensioned for accommodation in a battery compartment of standard size so that the battery substitute pack 10 including the integral charging circuit 14 may be substituted for a conventional rechargeable or non-rechargeable battery or be replaced thereby.

Figure 2:
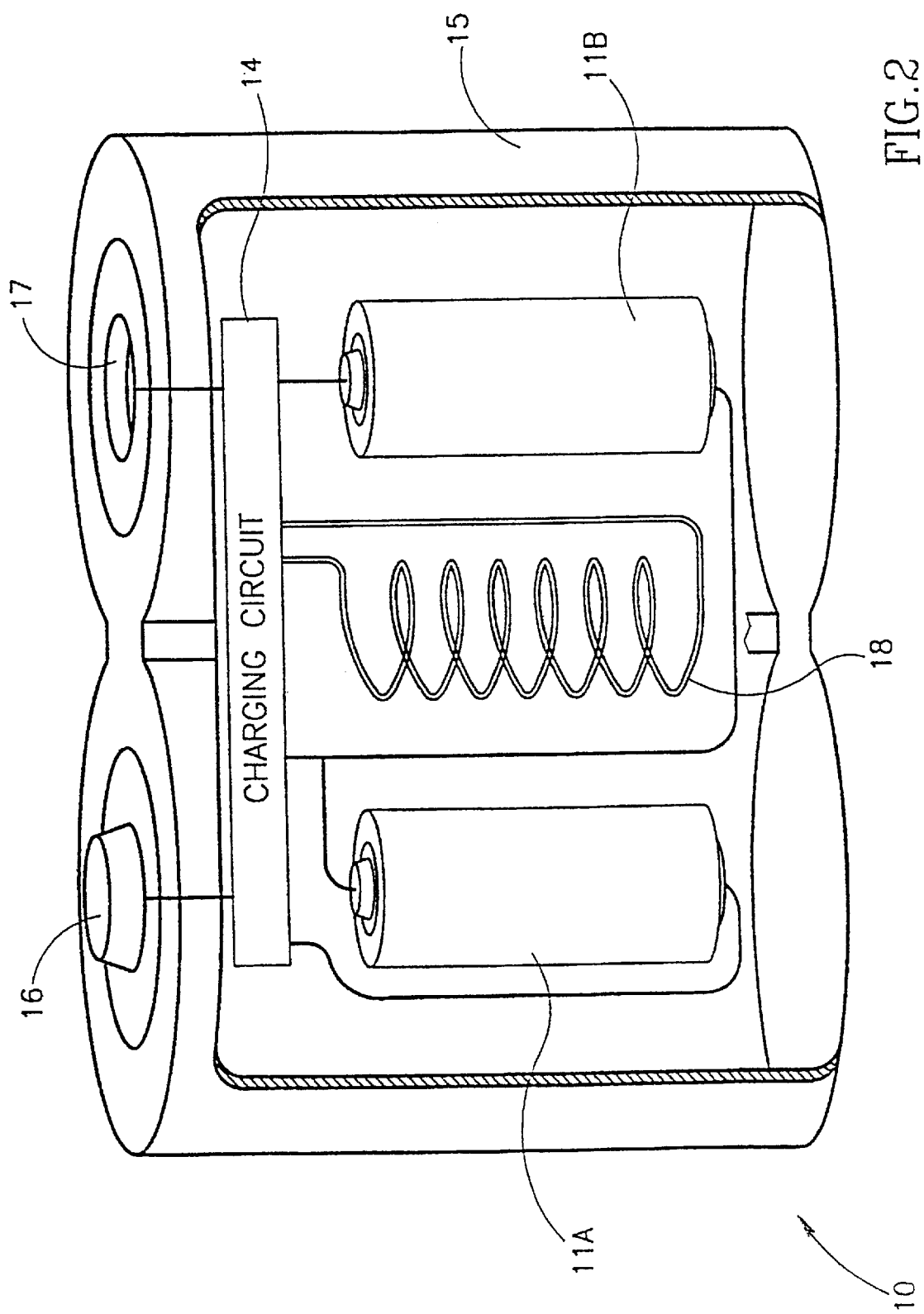
FIG. 2 is a pictorial representation of a battery substitute pack according to a second embodiment of the invention for substituting for more than one standard battery.

FIG. 2 shows pictorially a second embodiment for use in appliances having several batteries connected in series so as to increase the supply voltage. In this case, the battery substitute pack 10 contains a plurality of cells 11a, 11b connected in series, and being housed in a casing 15 having an overall dimension suitable for fitting in the battery compartment of the appliance and having positive and negative end terminals 16 and 17, respectively, for mating with the positive and negative contacts in the battery compartment. Each of the rechargeable cells 11*a*, 11*b* is separately connected to respective inputs of the charging circuit 14, in order to allow for the provision within the battery substitute pack 10 of rechargeable cells having different charge rates. Whilst the casing 15 shown in FIG. 2 is adapted for a battery compartment having batteries in side by side arrangement, it may equally well be dimensioned for accommodating the rechargeable cells in an end to end disposition.

In both embodiment, since the casing 15 is dimensioned for accommodation in a battery compartment of standard size, it will be apparent that the rechargeable cells 11, 11*a* and 11*b* are smaller than comparable rechargeable batteries adapted for mounting in the battery compartment.

FIG. 3 is a block diagram showing functionally the principal components in a charging unit 20 containing a primary coil 21 for producing magnetic flux which surrounds the charging unit 20. The primary coil 21 is connected to an oscillator 22 for supplying alternating current to the primary coil 21. An oscillator control circuit 23 is coupled to the oscillator 22 for supplying electrical power thereto and is itself connected to an external power source (not shown) via an internal power supply 24. The oscillator 22, the oscillator control circuit 23 and the power supply 24 are responsively coupled to a control and monitoring circuit 25 for controlling the operation of the charging unit 20. The external power source can be a conventional 115-volts, 60 Hertz (or 220-volts, 50 Hertz) outlet, as well as a vehicle battery or any other suitable power source.

Also shown functionally in FIG. 3 is a detail of the battery substitute pack 10 which can be standalone or mounted in a portable appliance. The rechargeable cell 11 within the battery substitute pack 10 is connected to the secondary coil 18 by way of an AC/CD converter 26. The rechargeable cell 11 is connected to a load 27 via a load interface circuit 28. The rechargeable cell 11, the AC/DC converter 26 and the load interface circuit 28 are responsively coupled to a control and monitoring circuit 29 for controlling their operation. For example, the control and monitoring circuit 29 may use sensors responsive to gas pressure, temperature and voltage or any combination thereof in order to limit the charging rate, thereby ensuring high efficiency and avoiding overcharging. In such an arrangement, the AC/DC converter 26, the load interface circuit 28 and the control and monitoring circuit 29 together constitute the integral charging circuit 14.

Operation of the system is as follows. When it is required to recharge the rechargeable cell 11, the battery substitute pack 10 is placed in the proximity of the charging unit 20 which is connected to an external power source and switched on. Power is thereby supplied to the oscillator control circuit 23 for energizing the oscillator 22 so as to generate an alternating current signal of prescribed frequency which is supplied to the primary coil 21. As a result, a varying magnetic field is created around the primary coil 21 in the vicinity of the charging unit 20.

The varying magnetic field induces an e.m.f. in the secondary coil 18 within the battery substitute pack 10 and gives rise to an alternating current which is rectified by the AC/DC converter 26 . The d.c. output from the AC/DC converter 26 is fed to the rechargeable cell 11 and is thereby recharged. In this way, the battery substitute pack 10 can be charged inductively without being conductively connected to the charging unit 20.

A load connected to the load interface circuit 28 within the appliance may be energized by the battery substitute pack 10 both during the recharging process, when the rechargeable cell 11 is only partially charged, as well as when the recharging process has completed. Likewise, for as long as some residual charge remains in the rechargeable cell 11, the appliance can continue to operate even when remote from the charging unit 20 such that current is no longer induced in the secondary coil 18.

The physical construction of the charging unit 20 can be arbitrary, and usually is a compromise between mechanical structure offering maximum induction efficiency and other parameters, such as appearance as well as safety considerations which may impose limitations on the magnitude of the magnetic field flux. Since the charging circuitry is close to the rechargeable cell 11, various parameters (particularly temperature) can be measured and used for maximizing the charging efficiency and the number of charge/discharge cycles so as thereby to increase the life of the rechargeable cell 11.

The battery substitute pack 10 can operate in several different operational modes, depending upon the state of the load connected thereto and whether it is within the region of influence of the remote charging unit 20. Likewise the load can be in idle or operational states. In idle state, such as when the appliance is not working or the battery substitute pack 10 is not housed in the appliance, no load is connected to the load interface 28. In operation mode, the battery substitute pack 10 is housed in the appliance which is turned on, thus consuming energy stored in the rechargeable cell 11 within the battery substitute pack 10. The received magnetic flux may or may not be of sufficient magnitude thus determining whether the rechargeable cell 11 is charged or not. During charging of the rechargeable cell 11, the charging unit 20 is operative for inducing current in the secondary coil 18 and the battery substitute pack 10 is in the vicinity of the field produced by the charging unit 20. During the non-charging state, the battery substitute pack 10 is not inductively coupled to the charging unit 20 as is the case when the charging unit 20 is inoperative or the battery substitute pack 10 is not in the vicinity of the charging unit 20; or there is simply insufficient magnetic flux such that all the received energy is used to operate the appliance.

If, in the charging state, the load is idle then all the energy absorbed is directed to full charging of the rechargeable cell 11 via the charging circuit 14. In the case where the load is in operational state, the induced energy serves the load and only the residual energy is transferred to the charging of the rechargeable cell 11 via the charging circuit, thus offering only partial charging capability. It may also occur that the battery substitute pack is inductively coupled to the charging unit 20, but all the energy transferred is required for operation of the appliance such that no residual energy remains for charging the cell 11.

The battery substitute pack 10 can also operate independent from the remote charging unit 20 during idle or operational states of the appliance. In the case that the appliance is operational, the rechargeable cell 11 is drained without being recharged thus allowing the appliance to continue operating until the rechargeable cell 11 is spent.

The charging unit 20 has been described only functionally since it is not in itself a feature of the invention. Any of the charging circuits shown in the prior art and to which reference has been made may be used and modifications can be made thereto as required.

Figure 4:
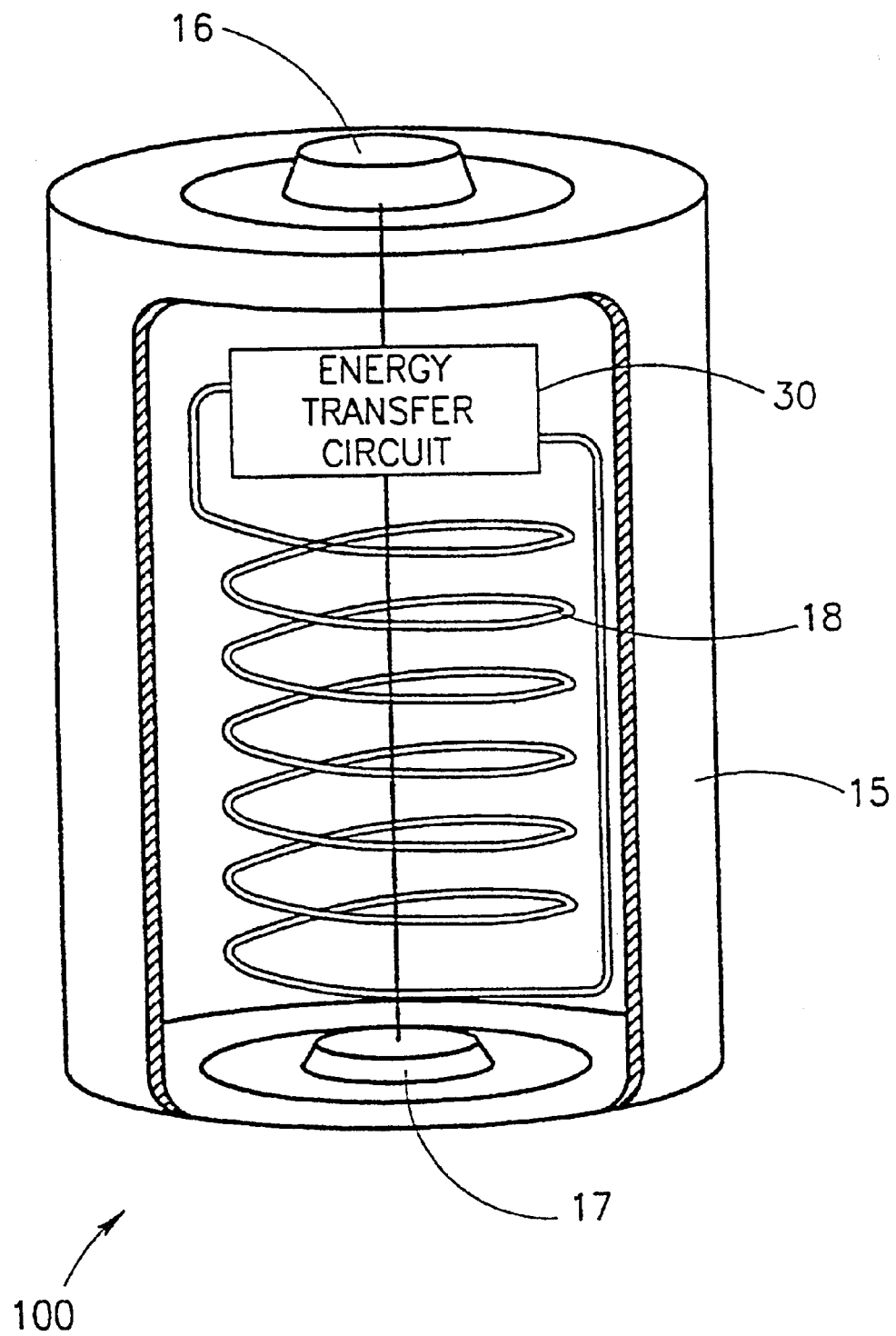
FIG. 4 is a partially sectioned pictorial representation of a battery substitute pack including an energy transfer circuit according to a third embodiment of the invention.

FIG. 4 shows a modification to the battery substitute pack 10 described above with reference to FIG. 1 in accordance with a third embodiment of the invention. To the extent that both embodiments share common components, identical reference numerals will be employed. There is thus provided a battery substitute pack 100 having a casing 15 dimensioned for accommodation in a battery compartment of standard size. Projecting from opposite ends of the casing 15 are positive and negative terminals 16 and 17 respectively coupled to an integral energy transfer circuit 30 for permitting remote energy capture via a contactless charging unit similar to the unit described above with reference to FIG. 3 of the drawings. Also connected to the energy transfer circuit 30 is a coil 18 (constituting a secondary coil) for inductive coupling with a primary coil in the charging unit, whereby current may be induced remotely in the coil 18 without contact thereby transferring energy from the remote charging unit to the energy transfer circuit 30.

Such an embodiment allows an appliance containing the battery substitute pack 100 to be operated within the proximity of a remote charging unit and is particularly useful for energizing portable appliances which are used close to a conventional electrical socket to which the remote charging unit can be connected. By such means, for example, the charging unit can be supported underneath an office desk allowing a portable appliance, such as a hand-held dictating machine to be used without requiring an internal battery and without being connected to the electrical socket via a cord and transformer/adapter. On those occasions, when the appliance is transported, the battery substitute pack 100 may be replaced either by a conventional battery or by the battery substitute pack 10 according to the first embodiment and containing a rechargeable cell. In the latter case, the casing 15 may allow access to the rechargeable cell, permitting its replacement or removal altogether.

Thus the particular novelty of the invention resides in the packaging of an energy transfer circuit in a casing which is dimensioned for accommodation in a battery compartment of standard size and which allows for the capture of energy inductively thus not requiring physical contact with an external charging unit. If desired, a rechargeable cell may be connected to the energy transfer circuit which operates as a charging circuit for recharging the rechargeable cell.

It is further to be understood that within the context of the invention the term "standard" as applied to battery casings is not to be confused with the term "industry standard". Whilst it is, of course, true that standards such as "A", "AA", "B" are indeed industry standards common to all battery manufacturers, the invention does not preclude the possibility that manufacturers may employ their own unique standards for a specific product which are not universally employed by their competitors.

For example, battery packs for mobile telephones often contain industry standard rechargeable cells which are housed in a custom casing which is standard for a specific manufacturer only. Such a battery pack may still be replaced by the substitute battery pack according to the invention providing that its casing and external contact arrangement conform to the manufacturer's standard.

Finally, it is to be understood that whilst the charging unit according to the invention has been described with particular reference to the use of inductive coupling in order to effect the desired energy transfer, any other suitable form of non-contact energy transfer may equally well be employed. For example, high energy radio frequency signals may be transmitted to the energy transfer circuit within the substitute battery pack in order to supply electric power to an appliance containing the substitute battery pack and/or to recharge a rechargeable cell or cells therein. In such an embodiment, the contactless charging unit includes an r.f. transmitter having a transmitter antenna for transmitting a high energy r.f. signal to the battery substitute pack. The energy transfer circuit within the battery substitute pack is responsively coupled to a receiver antenna for receiving the r.f. signal and supplying electrical power to an appliance containing the battery substitute pack and/or recharging at least one rechargeable cell within the battery substitute pack.

What is claimed is:

1. A battery substitute pack capable of being mounted in a battery compartment of an electrical appliance for providing energy thereto, said battery compartment having fixed thereto a positive contact and a negative contact for engaging corresponding positive and negative terminals of the battery substitute pack disposed in a casing thereof, there being further included:
an energy transfer circuit within the casing being connected to said positive and negative terminals and capable of receiving electrical energy remotely via a contactless charging unit and at least partially energizing the electrical appliance.

2. The battery substitute pack according to claim 1, wherein the energy transfer circuit comprises a secondary coil capable of inductively coupling with a primary coil in the contactless charging unit, and further includes power supply means coupled to the secondary coil and responsive to current induced therein for supplying electrical power to an appliance containing said battery substitute pack.

3. The battery substitute pack according to claim 2, further including at least one rechargeable cell within the casing and being coupled the energy transfer circuit for allowing the at least one rechargeable cell be charged remotely via the contactless charging unit.

4. The battery substitute pack according to claim 1, further including at least one rechargeable cell within the casing and being coupled the energy transfer circuit for allowing the at least one rechargeable cell be charged remotely via the contactless charging unit.

5. The battery substitute pack according to claim 3, wherein the casing is a sealed unit preventing access to the at least one rechargeable cell.

6. The battery substitute pack according to claim 3, wherein the casing is provided with access means for allowing replacement of at least one of the at least one rechargeable cell.

7. The battery substitute pack according to claim 1, wherein the casing is dimensioned for fitting in a battery compartment which is adapted for accommodating more than one battery of industry-standard size.

8. The battery substitute pack according to claim 4, wherein the energy transfer circuit is connected to a secondary coil for inductively coupling with a primary coil in the contactless charging unit, and further includes power supply means coupled to the secondary coil and responsive to current induced therein for supplying electrical power for recharging the rechargeable cell and for operating an appliance containing said battery substitute peak.

9. The battery substitute pack according to claim 1, wherein said predetermined size is an industry standard.

10. The battery substitute pack according to claim 1, wherein said predetermined size is specific to at least one battery manufacturer in respect of at least one product.

11. The battery substitute pack according to claim 1, wherein the contactless charging unit includes an r.f. transmitting having a transmitter antenna for transmitting a high energy r.f. signal to the battery substitute pack, and the energy transfer circuit is responsively coupled to a receiver antenna for receiving the r.f. signal and supplying electrical power to an appliance containing the battery substitute pack.

12. The battery substitute pack according to claim 11, further including at least one rechargeable cell within the casing and being coupled to the energy transfer circuit for allowing the at least one rechargeable cell to be charged remotely via the contactless charging unit.

13. A battery system, comprising:
 a battery substitute pack capable of being mounted in a battery compartment of an electrical appliance for providing energy thereto, and having an energy transfer circuit within a casing thereof being connected to a secondary coil as well as to positive and negative terminals of the battery substitute pack and to positive and negative terminals of at least one rechargeable cell within the casing, and
 a contactless charging unit comprising:
  a primary coil, and
  an oscillator for supplying varying current to the primary coil so as to generate magnetic flux across the primary coil for generating a varying current in the secondary coil by induction.

14. The battery system according to 13, wherein the contactless charging unit includes an r.f. transmitter having a transmitter antenna for transmitting a high energy r.f. signal to the battery substitute pack, and the energy transfer circuit is responsively coupled to a receiver antenna for receiving the r.f. signal and supplying electrical power to an appliance containing the battery substitute pack.

* * * * *

UNITED STATES PATENT AND TRADEMARK OFFICE
CERTIFICATE OF CORRECTION

| | |
|---|---|
| PATENT NO. | : 6,208,115 B1 |
| APPLICATION NO. | : 09/446006 |
| DATED | : March 27, 2001 |
| INVENTOR(S) | : Yehuda Binder |

Page 1 of 1

It is certified that error appears in the above-identified patent and that said Letters Patent is hereby corrected as shown below:

On the Title page of the patent: in item (86), delete "(PCT/IL98/00194)" and insert therefor --(PCT/IL97/00194)--.

in item (87), delete "(WO98/48539)" and insert therefor --(WO98/58437)--.

in item (87), delete "(Oct. 29)" and insert therefor --(Dec. 23)--.

In the claims:

Claim 8, line 8 (column 8, line 55), delete "peak" and insert therefor --pack--.

Claim 14, line 1 (column 10, line 6), insert the word --claim-- after the word "to" and before the number "13".

Signed and Sealed this

Eleventh Day of November, 2008

JON W. DUDAS
*Director of the United States Patent and Trademark Office*